(12) United States Patent
Roberts

(10) Patent No.: US 10,785,918 B2
(45) Date of Patent: Sep. 29, 2020

(54) DEVICE AND METHOD FOR MEASURING THE PROPERTIES OF HAY USING NEAR INFRARED SPECTROSCOPY ON A LARGE SQUARE BALER

(71) Applicant: Jeffrey S. Roberts, Hudson, WI (US)

(72) Inventor: Jeffrey S. Roberts, Hudson, WI (US)

(73) Assignee: Harvest Tec, Inc., Hudson, WI (US)

( * ) Notice: Subject to any disclaimer, the term of this patent is extended or adjusted under 35 U.S.C. 154(b) by 441 days.

(21) Appl. No.: 15/731,284

(22) Filed: May 18, 2017

(65) Prior Publication Data

US 2018/0332773 A1  Nov. 22, 2018

(51) Int. Cl.
| | | |
|---|---|---|
| *A01F 15/10* | (2006.01) |
| *A01F 15/08* | (2006.01) |
| *G01N 21/359* | (2014.01) |
| *G01N 21/3563* | (2014.01) |
| *G01N 21/3554* | (2014.01) |
| *A01F 15/04* | (2006.01) |
| *G01N 21/84* | (2006.01) |

(52) U.S. Cl.
CPC ........ *A01F 15/0825* (2013.01); *A01F 15/101* (2013.01); *G01N 21/359* (2013.01); *G01N 21/3554* (2013.01); *G01N 21/3563* (2013.01); *A01F 15/042* (2013.01); *A01F 2015/102* (2013.01); *G01N 2021/8466* (2013.01); *G01N 2201/12* (2013.01)

(58) Field of Classification Search
CPC .. A01F 15/0825; A01F 15/042; A01F 15/101; A01F 2015/102; G01N 21/359; G01N 21/3554; G01N 2210/12; G01N 21/3563; G01N 2021/8466
USPC ..................................... 100/179, 188 R, 189
See application file for complete search history.

(56) References Cited

U.S. PATENT DOCUMENTS

| | | | | |
|---|---|---|---|---|
| 9,854,743 | B2 * | 1/2018 | Roberts ............... | A01F 15/0825 |
| 2010/0242749 | A1 * | 9/2010 | Demulder ............. | A01F 15/042 |
| | | | | 100/179 |
| 2012/0103205 | A1 * | 5/2012 | Kraus .................... | A01F 15/08 |
| | | | | 100/2 |
| 2012/0103207 | A1 * | 5/2012 | Kraus ................. | A01F 15/0816 |
| | | | | 100/45 |
| 2014/0360148 | A1 * | 12/2014 | Grosse Wienker .... | A01D 43/14 |
| | | | | 56/16.8 |
| 2016/0278294 | A1 * | 9/2016 | Younk ..................... | A01F 15/08 |

\* cited by examiner

*Primary Examiner* — Jimmy T Nguyen

(74) *Attorney, Agent, or Firm* — Skinner and Associates; Joel D. Skinner, Jr.

(57) ABSTRACT

A device and method comprising a large square baler with a pre-comprssion chamber that accumulates hay and moves it into the compression chamber, one or more near infrared specrocopy (NIRS) sensors mounted near the top of the pre-compression chamber, a means to read inputs from the sensors only when the stuffer forks are moving hayfrom the pre-compression chamber into the main chamber and a processor to average multiple readings from the nirs sensors from that inteval.

15 Claims, 5 Drawing Sheets

DEVICE AND METHOD FOR MEASURING THE PROPERTIES OF HAY USING NEAR INFRARED SPECTROSCOPY ON A LARGE SQUARE BALER

CROSS REFERENCE TO RELATED APPLICATION

This application is a continuation in part of U.S. patent application Ser. No. 13/906,971 filed May 31, 2013, U.S. Pat. No. 9,854,743.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of Invention

The present invention relates, generally, to crop harvesting apparatus and methods. Particularly, the invention relates to hay harvesting systems, apparatus and methods. The present invention is most particularly suitable for use in and for large rectangular (often called "square") hay balers.

2. Background Information

The term "hay" usually applies to crops of alfalfa or a variety of grass that is harvested by a baler that compacts the loose crop into units that can be handled or transported and are normally referred to as "bales". Bales are fed primarily to ruminant animals including cattle sheep and goats. Quality constituents of the hay that affect how ruminant animals respond to the feeding of hay are primarily net energy, in vitro digestibility, acid detergent fiber, neutral detergent fiber, protein, and moisture. The values of these factors can vary significantly from bale to bale and monitoring them is important so that the performance of the animal fed the hay in terms of daily weight gain or milk production can be properly managed by supplementing the diet of the livestock with other sources of feed to balance the values of the constituents measured in the hay.

The current practice for monitoring the quality of the constituents of hay has been to extract a 1 to 2 inch diameter core from a bale and send it to a laboratory that is able to run quality tests on the sample. Prior to 1980, those quality test were conducted using wet chemical test that analyzed the quality of the constituents and that takes three to six days to obtain results. Around 1980, it was discovered by several researchers that a near infrared spectroscopy (NIRS) sensor could estimate the level of the quality constituents in a sample of hay. The NIRS test equipment uses a light source to illuminate the hay sample and measures the reflective properties of the sample to estimate the level of the quality constituents. NIRS testing equipment began appearing in laboratories specializing in testing hay samples shortly thereafter as the labs began to develop the calibrations of the reflective values that were associated with the level of feed constituent quality. To assure maximum accuracy, the core samples from bales are dried and ground to a consistent particle size and moisture before being run thru the NIRS testing procedure. For the most accurate results from an NIRS sensor, the hay should be in contact with a lens covering the light and sensor. Currently most quality tests on hay are run on NIRS equipment that is setup on a stationary basis in laboratories.

Recently portable NIRS equipment has been introduced that can be used outside the laboratory on crops without having to pull core samples and send them into the laboratory. In portable applications, the samples are not ground or dried. The emitter light and reflective measuring equipment in a portable NIRS sensor has a maximum diameter of four inches which limits the accuracy of the NIRS to the reflective properties of measuring a small area of a somewhat non-uniform surface. The accuracy of the results of the tests using the portable NIRS sensor relies on taking multiple samples and averaging the values obtained. Since a large square bale of hay is normally between 3 and 4 feet wide, 3 and four feet tall and 5 and 8 feet long, one sample NIRS measurement of the hay is a very small percentage of the bale being analyzed and it would take hundreds of samples on the bale to yield a representative sample of the bale's quality constituents.

Sampling using NIRS to determine the values of the quality constituents relies on having a processor that has in memory expected reflective values for the quality constituents being measured. NIRS instrumentation both in laboratories and in portable systems will generate reflective values that can be given to the processor to compare to the expected values for the type of crop being tested and these expected value files must be updated from time to time.

Large square balers of hay have a pre-compression chamber that gathers the loose hay coming from the windrow laying on the ground with gathering forks. In the pre-compression chamber the hay is held by a door or retention forks until the density of the hay being bought in reaches a predetermined point, at which a door or forks open and the hay is brought into the main compression chamber of the baler. The U.S. patent application Ser. No. 13/906,917 claims to measure hay moisture at a known density state in the pre-compression chamber since density is a factor in the use of conductivity or micro-wave sensing of moisture across the bale to an opposing sensor. Density of the hay being sampled by NIRS is not a factor but assuring that the surface of the hay being sampled is consistent from sample to sample will assure that there is similarly minor amounts of air gaps in each sample being taken. Getting a multiple of sensor readings of the hay is a major factor to offset the comparative control in laboratory use of NIR that employs uniformity in sample preparation.

In the areas of the baler that are upstream to the pre-compression chamber, the limitation to placing NIRS sensors in the hay pickup area is due to interference between the NIRS sensors and pick-up mechanism. Also, in placing the NIRS sensors in the pickup area would result in inconsistent contact with the hay being sampled as the pickup teeth bring the hay up into the baler in bunches as the rows of teeth grab the hay. Sometimes the light from the NIRS sensor would shine on a thick amount of hay, sometimes, it would shine on no hay at all. Located the NIRS sensors on the side, top or bottom of the formed bale would result in limited readings since the bale moves at a rate of under 3 inches per second after it is compacted in the main chamber.

In the present invention, NIRS sensors are placed in the pre-compression chamber and read the hay as it passes over the sensor in a consistent rapid flow of hay moving in excess of 50 inches per second, resulting in the ability to take large multiples of samples and average those values for acceptable accuracy.

BRIEF SUMMARY OF THE INVENTION

The present invention provides for a consistent series of readings from near infrared spectrographic sensors (NIRS) where the values of the readings can be averaged to provide for improved accuracy compared to readings from NIRS values taken from individual readings. Consistency of the readings from the NIRS is obtained by placing one or multiples of the NIR sensors near the top of the pre-compression chamber of a large square baler, determining the interval when the hay crop is moving over them by sensing the point at which the stuffer forks move the hay into the main chamber from the pre-compression chamber.

The device and method involve one or more NIR sensor mounted on the top, bottom or sides of the re-compression chamber. When a signal that the stuffer forks have started moving the hay into the main chamber is received by an associated processor, readings from the NIR sensors are taken at a rapid rate, recorded to the processor and then averaged for an accurate reading of the quality of constituents including net energy, in vitro dry matter digestibility, acid detergent fiber, neutral detergent fiber, protein and moisture.

DETAILED DESCRIPTION

Figure 1:
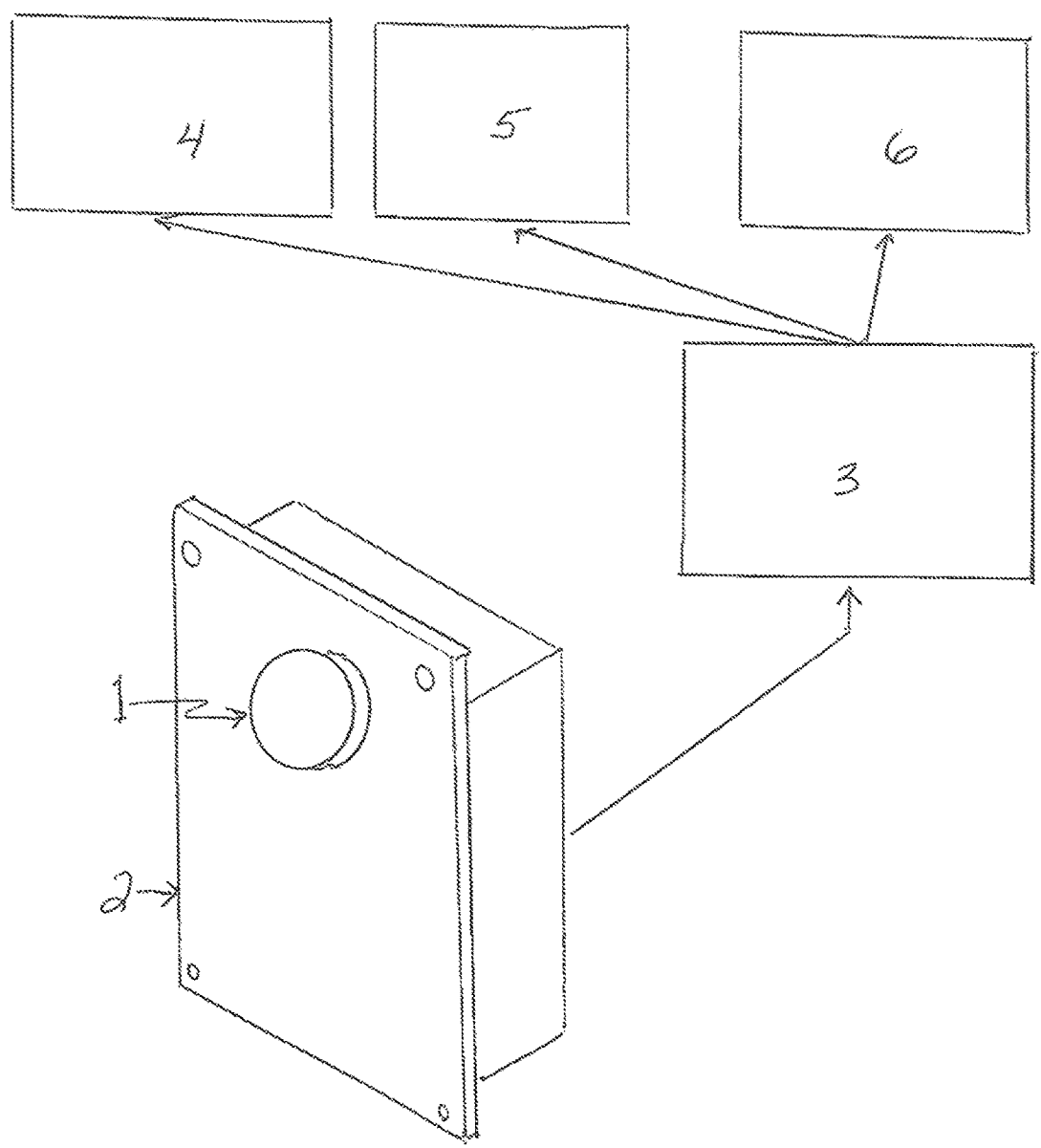
FIG. 1 is a typical near infrared spectroscopy sensor, connected to the main processor with further connections to alternative display, bale tagger and telemetry communication.

Near infrared spectroscopy is read by emitting light thru a lens 1, FIG. 1, and reading the reflection of that light back thru the same lens 1 that is mounted on a sensor enclosure 2. The sensor enclosure also houses a power supply delivering DC power to the light and recording the reflective values taken from the light. The level of reflection is then sent as a message to a processor which alternatively could be housed separately or within the sensor enclosure 2. The processor has a software file with the expected values of reflection compared to a level of quality constituents including: net energy, in vitro dry matter digestibility, acid detergent fiber, neutral detergent fiber, protein and moisture. After the comparison is completed, the processor 3 averages multiple readings communicating the value to a display 4. Alternatively, the processor can communicate the values to a bale tagger 5 or a telemetry module 6 which will communicate the values to a remote receiver.

Figure 2:
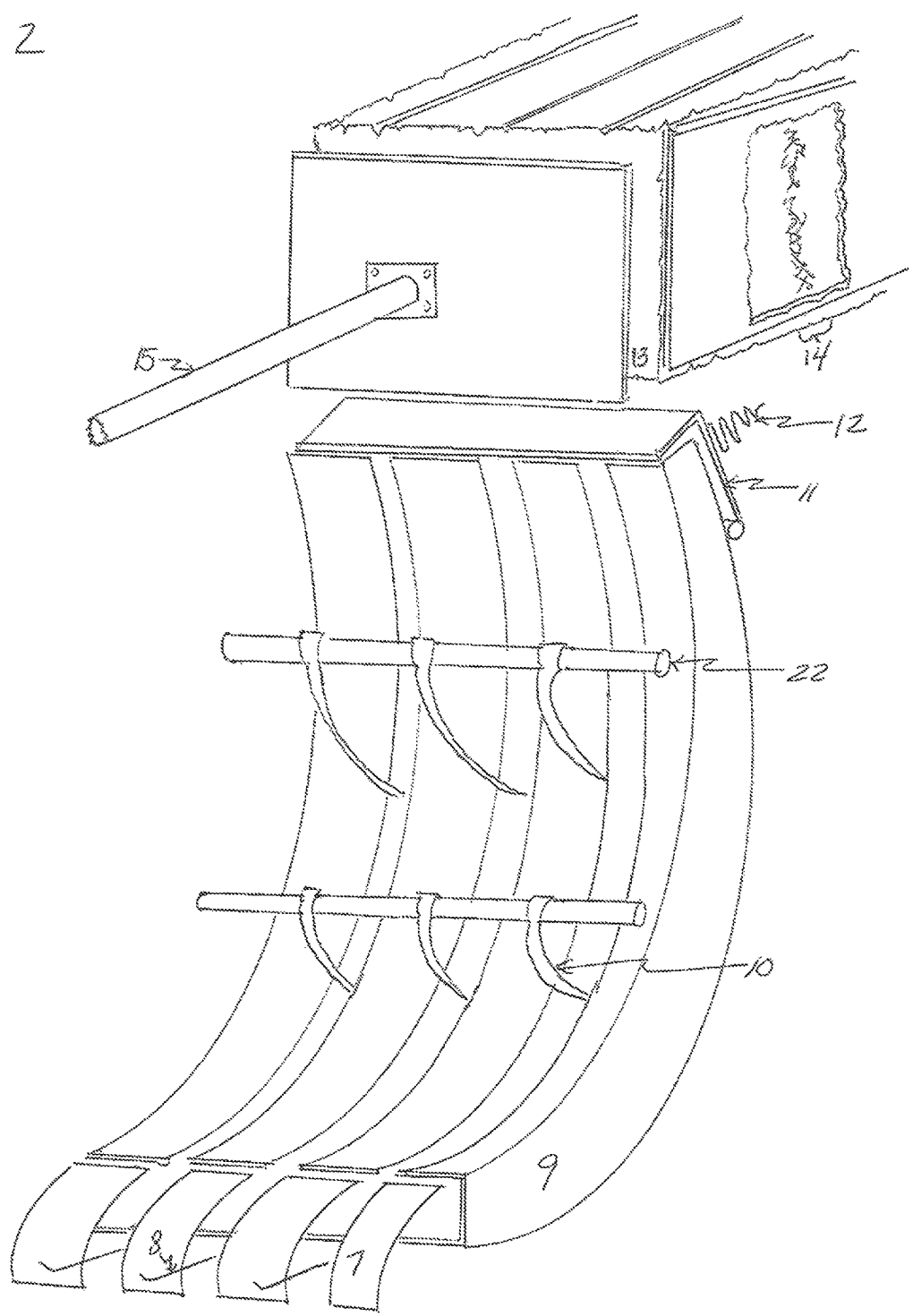
FIG. 2 shows the components of a typical large square baler with a hay pick-up, a pre-compression chamber and the main chamber.

Referring to FIG. 2 a large square baler picks up hay with a pick-up head 7 and the pick-up teeth 8 move the hay to a pre-compression chamber 9 where the packer fingers 10 continue to move the hay into the pre-compression chamber. A door, 11 is in the closed position at the top of the pre-compression chamber holding the hay in place in the pre-compression chamber 9 as the packer fingers 10 continue to fill the pre-compression chamber up with hay. The door 11 is held in place by a tension device 12 until a desired density of hay is reached and then the tension device allows the door to open and for hay to pass into the chamber 13. Each time the door opens, passing hay into the chamber a flake 14 is formed as the hay is compacted by the plunger 15.

Figure 3:
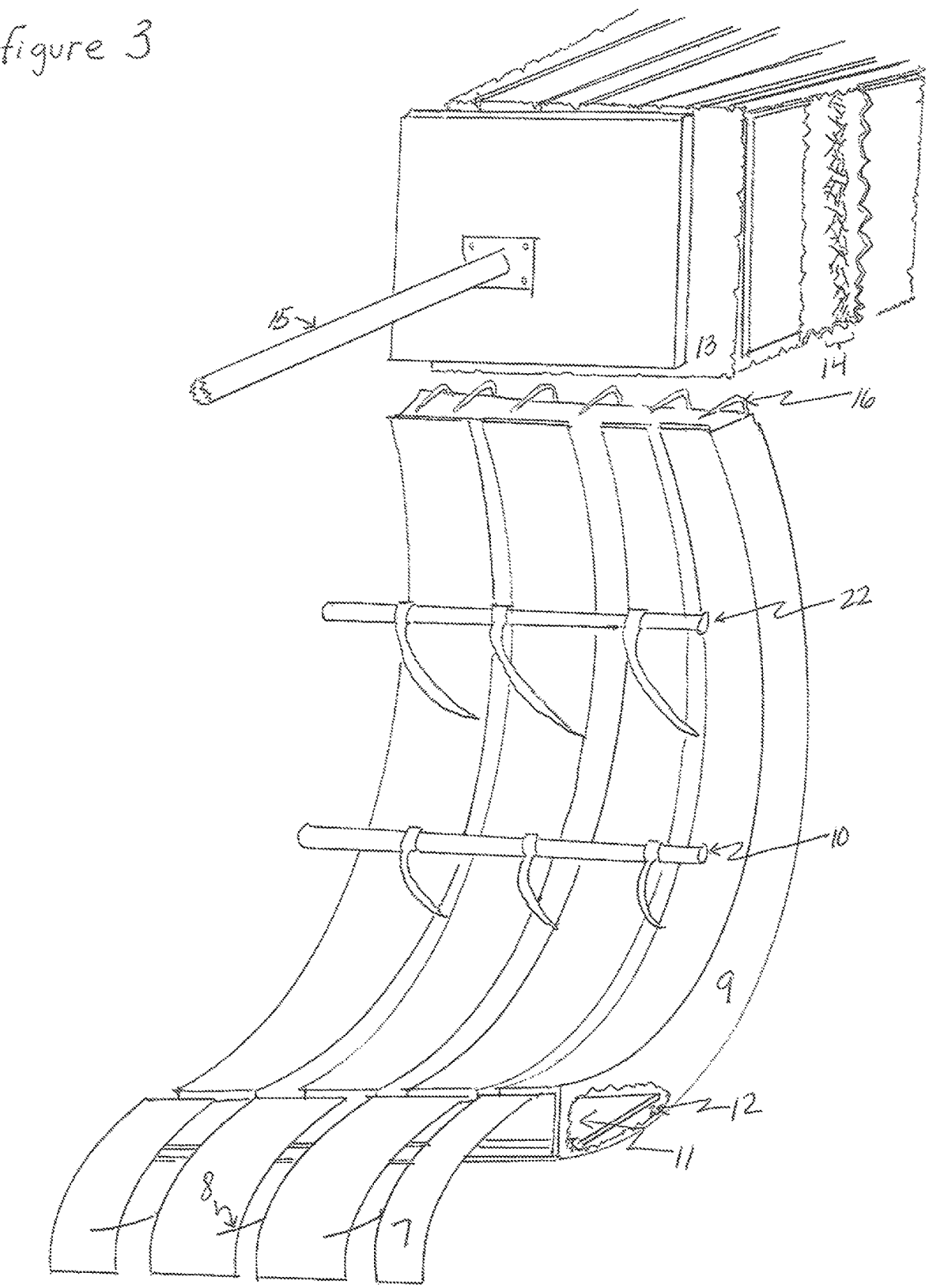
FIG. 3 is a pre-compression chamber with the density sensing door located at the bottom of the pre-compression chamber alternatively used on large square balers.

Referring to FIG. 3, alternatively the door 11 held in place by a tension device 12 can be located at the bottom of the pre-compression chamber 9. In this configuration the hay being brought into the pre-compression chamber is held in place by retention fingers 16 until hay in the pre-compression chamber reaches a desired density and the door is pressed down signaling to the retention fingers 16 to open and release the hay into the bale chamber to form a flake 14.

In both configurations (door at the top of the pre-compression chamber, FIG. 2 or at the bottom of the pre-compression chamber, FIG. 3, when the door opens it sends a signal to the stuffer forks 22 to engage and move the hay up into the bale chamber 13. The stuffer forks clear the hay out of the pre-compression chamber in steady movement over a 30 millisecond to 2 second interval when they are activated. This state of movement of the hay provides the opportunity to sense the NIRS on multiple samples with similar density as the hay moves past the NIRS sensors.

Figure 4:
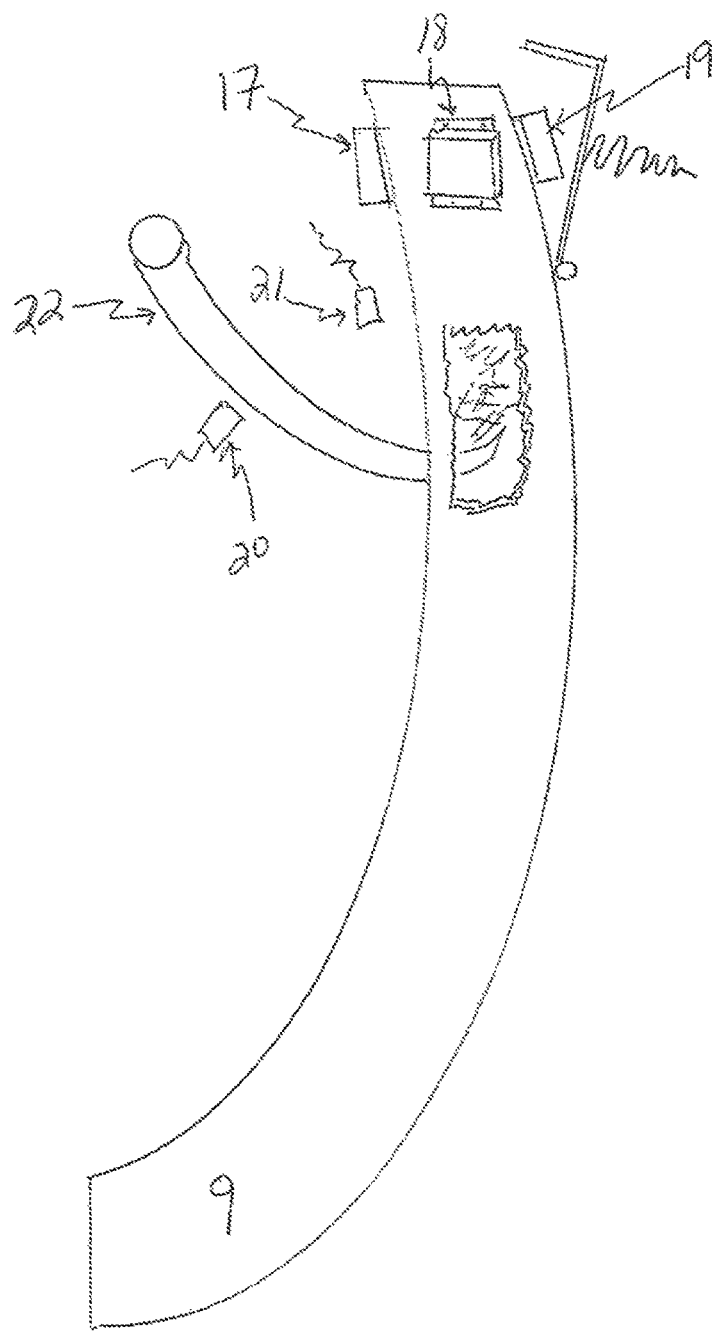
FIG. 4 is a side view of the pre-compression chamber with NIRS sensors mounted alternatively on the front, back and side.

Referring to FIG. 4, the NIRS sensors can be located on the front of the pre-compression chamber 17, on the side of the pre-compression chamber 18, or on the back of the pre=compression chamber 19. In any of the 3 alternative positions listed here, the NIRS sensors are placed as close to the top of the pre-compression chamber as possible, to take reading from as much of the hay as possible as it passes uniformly by the sensors. The NIR sensors in any position described herein are triggered to start reading when the stuffer forks 22 start to move signaled by sensor 20. The processor 3 controls the frequency of reading for the NIRS sensors 17, 18 and/or 19 from 5 times per second up to 1000 times per second. The processor signals the NIRS sensors to stop reading when a sensor 21 indicates that the stuffer forks have reached their maximum upward travel or alternatively, when a distinct change in reflective readings from the NIRS sensor is observed due to the state of all the hay being moved out of the pre-compression chamber. By controlling the reading based on movement of the stuffer forks 22, a string of readings from the NIRS sensors will always be on a state of hay with similar density and therefore have a similar reflective surface.

Figure 5:
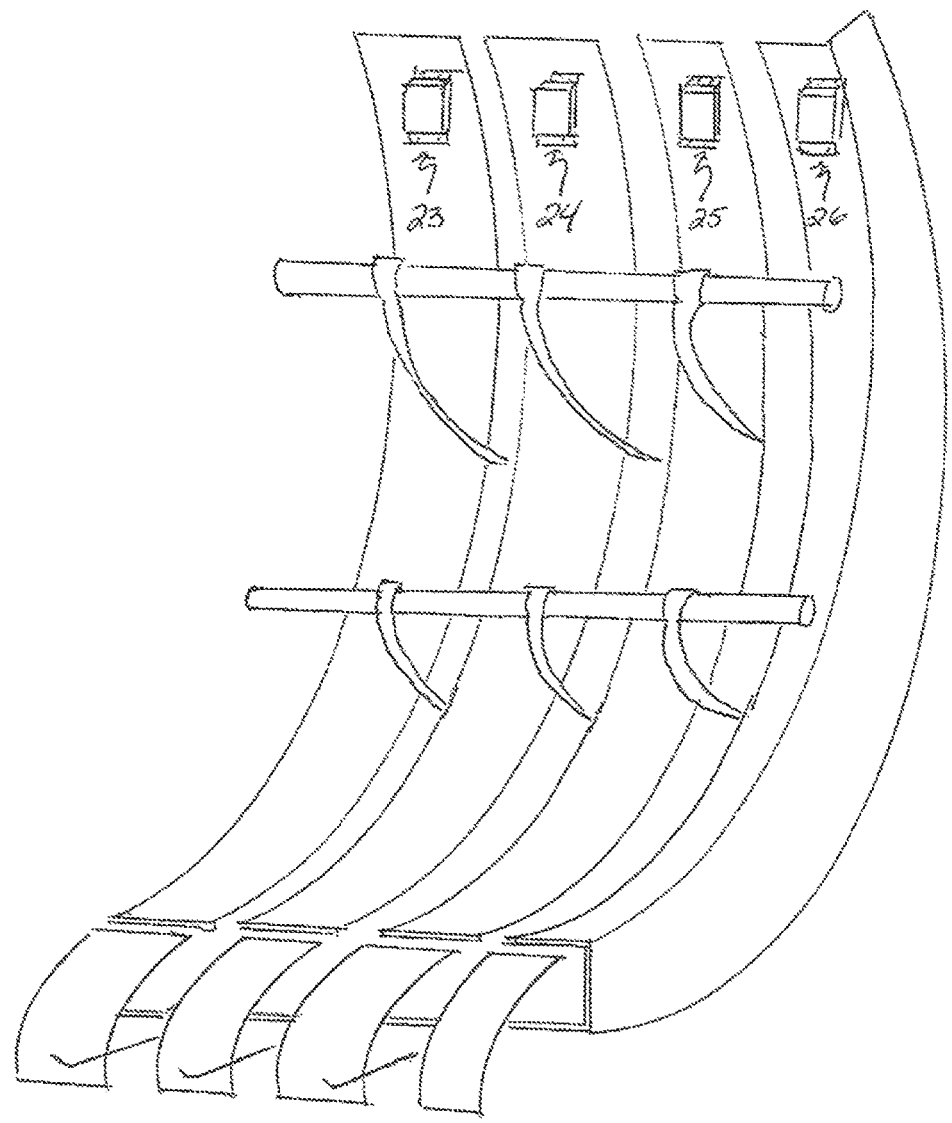
FIG. 5 is a pre-compression chamber with an example of multiple NIRS sensor.

A large square bale will have between 20 and 50 individual flakes 14 and with the NIRS sensors being controlled by the movement of the stuffer forks, each flake will have multiple readings from the NIRS sensor, of between 5 and 1000 per cycle of the stuffer forks or per flake, that can be averaged by the processor for storing or communicated the feed constituent quality values desired to be measured. In most cases, one NIRS sensor placed in the alternative locations at the top of the pre-compression chamber provides for a representative sample of the hay. The processor can be programmed to average all the flakes and derive a bale average for the feed quality being measured. Referring to FIG. 5 two or more NIRS sensors, as an example 23, 24, 25 and 26 can be mounted in either the front or the back of the pre-compression chamber, providing for a more complete test of the bale when the processor combines reading from the multiple sensors and averages all of the values together.

What is claimed:

1. A large square hay baler of a type having a pre-compression chamber with stuffer forks that are activated when a set density of hay in the pre-compression chamber is reached, wherein the improvement comprises, a Near Infrared Spectroscopy (NIRS) sensor located near a top of the pre-compression chamber, means to activate the NIRS sensor when the stuffer forks start to move, a processor communicatively connected to the NIRS sensor for receiving information readings from the NIRS sensor for a predetermined period of time when the hay in the pre-compression chamber is moving past the NIRS sensor.

2. The hay baler as in claim 1, wherein the processor has, stored in a memory, values expected for the information from the NIRS sensor for moisture of hay, wherein the processor averages a predetermined set of information readings from the NIRS sensor during the period of time, wherein the processor compares that average to the values expected in memory, and wherein the processor assigns a moisture value to the hay being measured by the NIRS sensor during the period of time.

3. The hay baler as in claim 1, wherein there are between 2 and 10 individual NIRS sensors located near the top of the pre-compression chamber and wherein the processor averages the information readings from the sensors present.

4. The hay baler of claim 1, wherein the large square bale baler form bales between 3-4 feet wide, 3-4 feet tall, and 5-8 feet long, comprising 20 to 50 individual hay flakes.

5. The hay baler of claim 4, further comprising a pickup head connected to an input end of the pre-compression chamber, a bale chamber connected to an output end of the pre-compression chamber, and a tensioned member disposed between the output end of the pre-compression chamber and the bale chamber.

6. The hay baler of claim 5, further comprising a plurality of pick-up teeth disposed in the pickup head for moving hay from the pickup head into the pre-compression chamber, a plurality of packer fingers disposed in the pre-compression chamber for moving hay through the pre-compression chamber, and wherein the stuffer forks move hay from the pre-compression chamber into the bale chamber upon release of the tensioned member.

7. The hay baler of claim 1, wherein the means to activate comprises a start sensor disposed near the stuffer forks, the start sensor being communicatively connected to the processor to signal a start of stuffer fork movement and reading of signals from the NIRS sensor by the processor.

8. The hay baler of claim 7, further comprising a stop sensor disposed near the stuffer forks, the stop sensor indicating that the stuffer forks have reached a maximum travel, and a stop of reading of signals from the NIRS sensor by the processor.

9. The hay baler of claim 1, wherein the predetermined period of time is 30 milliseconds to 2 seconds.

10. The hay baler of claim 2, wherein the predetermined set of information readings comprises a reading taken at intervals of from 5 to 1000 times per second during the predetermined period of time.

11. The hay baler of claim 2, further comprising a display communicatively connected to the processor for showing the moisture value to a user of the hay baler.

12. The hay baler of claim 2, further comprising a bale tagger communicatively connected to the processor for labeling a bale with the moisture value.

13. The hay baler of claim 2, further comprising a telemetry module communicatively connected to the processor for transmitting the moisture value to a remote receiver.

14. A large square bale hay baler, comprising:
a pickup head for gathering hay;
a pre-compression chamber connected to an output end of the pickup head for compressing hay gathered by the pickup head, the pre-compression chamber having a plurality of packer fingers for moving hay through the pre-compression chamber, and a plurality of stuffer forks for moving hay out of the pre-compression chamber;
a bale chamber connected to an output end of the pre-compression chamber for forming large hay bales;
a tensioned member disposed between the pre-compression chamber and the bale chamber for releasing hay from the pre-compression chamber into the bale chamber when hay in the pre-compression chamber has reached a predetermined density;
an electronic processor for processing information about at least one quality of the hay being baled, the at least one quality including moisture content;
at least one Near Infrared Spectroscopy (NIRS) sensor disposed near the output end of the pre-compression chamber for sensing moisture content, for a predetermined time period, in hay between the pre-compression chamber and the bale chamber, the at least one NIRS sensor being communicatively connected to the processor; and
a stuffer fork start sensor for activating the at least one NIRS sensor for a predetermined period of time when the stuffer forks start to move.

15. A large square bale hay baler with mobile Near Infrared Spectroscopy (NIRS) hay quality determination capability, comprising:
a pickup head for gathering hay;
a pre-compression chamber connected to an output end of the pickup head for compressing hay gathered by the pickup head, the pre-compression chamber having a plurality of packer fingers for moving hay through the pre-compression chamber, and a plurality of stuffer forks for moving hay out of the pre-compression chamber;
a bale chamber connected to an output end of the pre-compression chamber for forming large hay bales between 3-4 feet wide, 3-4 feet tall, and 5-8 feet long, comprising 20 to 50 individual hay flakes;
a tensioned member disposed between the pre-compression chamber and the bale chamber for releasing hay from the pre-compression chamber into the bale chamber when hay in the pre-compression chamber has reached a predetermined density;
an electronic processor for processing information about at least one quality of the hay being baled, the at least one quality including moisture content;
at least two Near Infrared Spectroscopy (NIRS) sensors disposed near the output end of the pre-compression chamber for sensing moisture content, for a predetermined time period between 30 milliseconds and 2 seconds, in at least one hay flake formed between the pre-compression chamber and the bale chamber, the at least two NIRS sensors being communicatively connected to the processor;

a stuffer fork start sensor for activating the at least two NIRS sensors for a predetermined period of time when the stuffer forks start to move;

a stuffer fork stop sensor disposed near the stuffer forks, the stop sensor indicating that the stuffer forks have reached a maximum travel, and a stop of reading of signals from the at least two NIRS sensors by the processor; and at least one hay quality output selected from the group consisting of a display, a bale tagger, and a telemetry module, the at least one hay quality output being communicatively connected to the processor.

\* \* \* \* \*